US006769529B2

United States Patent
Fournier et al.

(10) Patent No.: US 6,769,529 B2
(45) Date of Patent: Aug. 3, 2004

(54) TURNING DEVICE FOR LUMBER AND THE LIKE

(75) Inventors: Germain Fournier, Senneterre (CA); Claude Goulet, Belcourt (CA)

(73) Assignee: Quebec Inc., Senneterre (CA)

( * ) Notice: Subject to any disclaimer, the term of this patent is extended or adjusted under 35 U.S.C. 154(b) by 0 days.

(21) Appl. No.: 09/942,682

(22) Filed: Aug. 31, 2001

(65) Prior Publication Data

US 2002/0066343 A1 Jun. 6, 2002

(30) Foreign Application Priority Data

Dec. 5, 2000 (CA) .............................................. 2327601

(51) Int. Cl.[7] .............................................. B65G 47/24
(52) U.S. Cl. ........................ 198/403; 198/404; 198/395
(58) Field of Search ................................ 198/401, 403, 198/404, 408, 413, 395, 399

(56) References Cited

U.S. PATENT DOCUMENTS

| | | | | |
|---|---|---|---|---|
| 3,920,132 A | * | 11/1975 | Cleland et al. | 414/791.3 |
| 4,484,675 A | * | 11/1984 | Doherty et al. | 198/413 |
| 4,706,798 A | * | 11/1987 | Hollmann | 198/399 |
| 4,907,686 A | * | 3/1990 | Cotic | 193/45 |
| 5,143,197 A | * | 9/1992 | Sauer | 198/409 |
| 5,341,910 A | * | 8/1994 | Sauer | 198/403 |
| 5,412,220 A | * | 5/1995 | Moore | 250/559.48 |
| 5,482,140 A | * | 1/1996 | Moore | 198/403 |
| 5,518,106 A | * | 5/1996 | Allard | 198/459.5 |
| 5,605,216 A | * | 2/1997 | Raybon et al. | 198/395 |
| 6,216,846 B1 | * | 4/2001 | Gunnarsson | 198/413 |
| 6,315,103 B1 | * | 11/2001 | Boucherie | 198/395 |
| 6,446,785 B1 | * | 9/2002 | Tremblay | 198/404 |

FOREIGN PATENT DOCUMENTS

| | | | | |
|---|---|---|---|---|
| DE | 3546087 | * | 6/1987 | 198/404 |
| SU | 0753735 | * | 8/1980 | 198/404 |
| WO | PCT/SE97/00234 | | 8/1997 | |

* cited by examiner

*Primary Examiner*—Richard Ridley
(74) *Attorney, Agent, or Firm*—Ogilvy Renault

(57) ABSTRACT

A turning device comprises turning members moveable between an idle position and an operational position, a sensor located upstream of the turning member, for scanning the wood pieces on a conveyor, and a deflector controlled by the sensor and adapted, when actuated, to selectively cause the turning member to be displaced to the operational position for turning a given elongated wood piece on the conveyor to a desired position. The turning member is pivotally mounted to a motorised chain for continuously displacing the turning member adjacent the conveyor. The turning member also includes a guide pin, and the chain drives the turning member along a closed-loop guide track, the turning member having its guide pin engaged in the track.

9 Claims, 3 Drawing Sheets

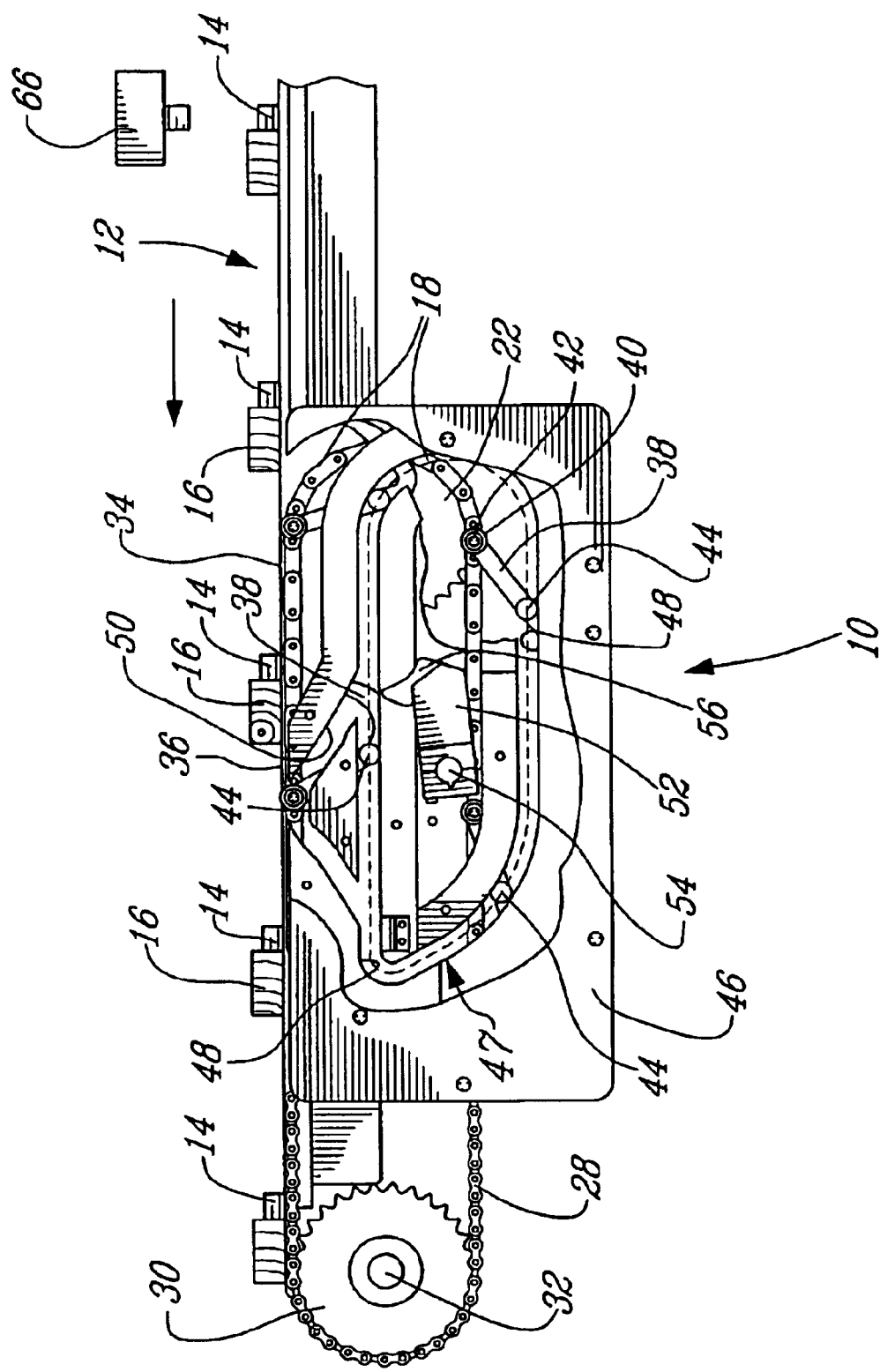

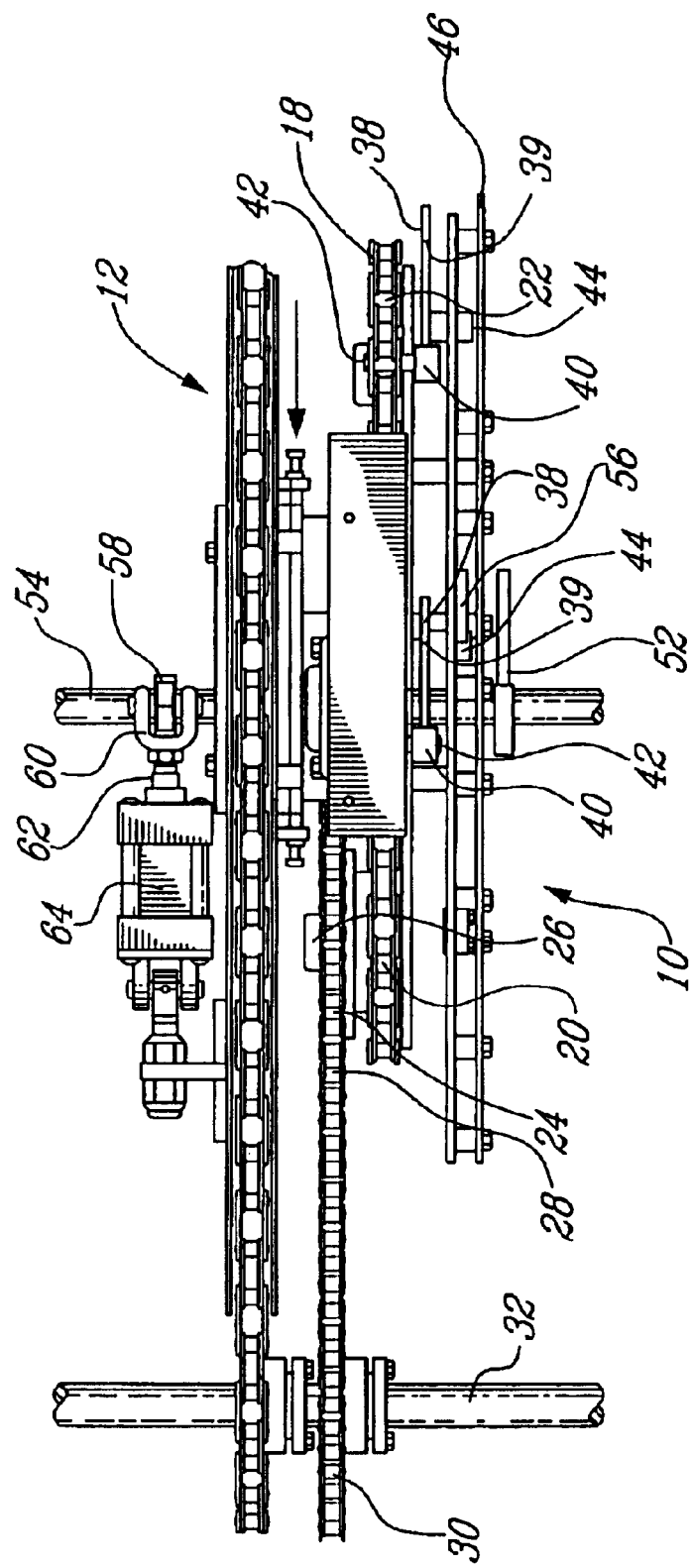
FIG_2

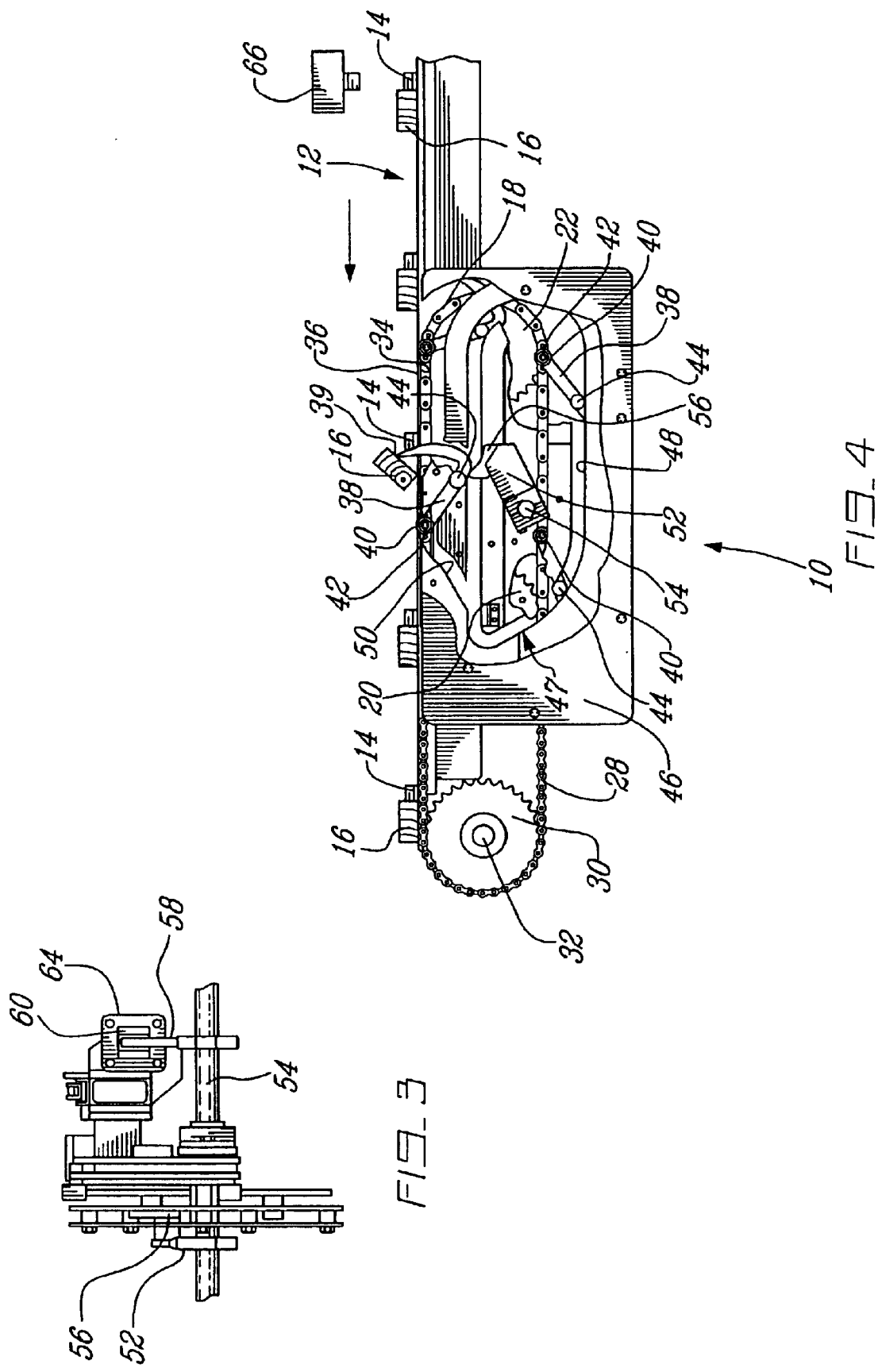

TURNING DEVICE FOR LUMBER AND THE LIKE

BACKGROUND OF THE INVENTION

1. Field of the Invention

The present invention relates to lumber handling devices and, more particularly, to a high-speed lumber turning device.

2. Description of the Prior Art

In the art of handling of lumber, such as boards, planks, battens, etc., it is often necessary to turn the pieces of lumber upstream of a planing machine or the like to have the most irregular shape side of each piece (flash sides) facing upward to optimize the planing of the wood piece. This upward orientation is due to the fact that, in saw mills, the thickest layer is removed from the top due to the adjustment of the cutting tools of the planing machines. Presently, because of the absence of adequate, reliable and efficient systems able to operate at high speeds, lumber industries frequently use manual labor to turn the wood pieces. This process has incurred many problems relating to the employees, such as tendinitis and the like, and to employers (quality of the work, profitability).

SUMMARY OF THE INVENTION

It is therefore an aim of the present invention to provide a turning device for selectively turning wood pieces or the like to a desired position on a high-speed conveyor.

Therefore in accordance with the present invention, there is provided a turning device for use in concert with a conveyor adapted to feed elongated wood pieces one-by-one to the turning device, comprising:

at least one turning member moveable between an idle position and an operational position;

a sensor located upstream of said turning member, for scanning the wood pieces on the conveyor; and an operator controlled by said sensor and adapted, when actuated, to selectively cause said turning member to be displaced to said operational position for turning a given elongated wood piece on the conveyor to a desired position.

Also in accordance with the present invention, there is provided a method for turning an elongated wood piece carried by a conveyor, comprising the steps of:

providing a sensor to determine if a wood piece is to be turned on the conveyor; and b) providing a motorized turning member automatically operated if it has been determined in step a) that the wood piece is to be turned such as to cause the elongated wood piece to be turned on the conveyor by said turning member to a desired position.

BRIEF DESCRIPTION OF THE DRAWINGS

Having thus generally described the nature of the invention, reference will now be made to the accompanying drawings, showing by way of illustration a preferred embodiment thereof, and in which;

FIG. 1 is a fragmented side elevational view of an embodiment of the turning device in accordance with the present invention;

FIG. 2 is a top plan view of the turning device of FIG. 1;

FIG. 3 is a rear end elevational view of the turning device of FIG. 1; and

FIG. 4 is a fragmented side elevational view of the turning device similar to FIG. 1 but showing a wood piece in the process of being turned.

DESCRIPTION OF THE PREFERRED EMBODIMENTS

In accordance with the present invention, FIGS. 1 to 4 illustrate a turning device 10 operating in parallel with a chain conveyor 12 comprising a plurality of stoppers 14 carrying a lumber piece 16 between each pair of successive stoppers 14 generally in abutment with the downstream stopper thereof. The turning device 10 comprises a first chain 18 defining a closed circuit and in operative contact with primary gears 20 and 22. The primary gear 22 is idle and free to rotate, while the primary gear 20 and a secondary gear 24 are fixedly mounted on a common shaft 26, as best shown in FIG. 2, such that both gears 20 and 24 rotate in concert. The secondary gear 24 is operatively connected to a second chain 28, which is driven by a secondary gear 30. The secondary gear 30 is rotatively engaged to a drive shaft 32, further driving the chain conveyor 12.

In reference to FIG. 1, the first chain 18 defines a generally horizontal obround shape and has a top aide 34 extending parallel and at a same level as a top side 36 of the chain conveyor 12. The lumber pieces 16 are carried by the stoppers 14 on the top side 36 of the chain conveyor 12.

As best seen in FIG. 4, the turning device 10 further comprises hooks 38. Each of the hooks 36 comprises a tip 39 at a free end thereof and an opposed end 40 provided with a bearing that is pivotally mounted to the first chain 18 by means of a bolt and nut assembly 42 thereby allowing the hook 38 to pivot with respect to the first chain 18. The bearing may be a ball bearing or the like. Each of the hooks 38 further comprises a guide pin 44 laterally projecting therefrom.

A template 46 is disposed adjacent and parallel the closed circuit defined by the first chain 18. The template 46 defines a guide track 47 comprising a generally oblong main section 48 and a by-pass section 50. The pins 44 of the hooks 38 are slidably engaged in the guide track 47 of the template 46, whereby the pins 44 of the hooks 38 slide along the guide track 47 when driven by the first chain 18.

A lever 52 is fixed at a lower end thereof to a shaft 54. An opposed upper end of the lever 52 comprises a deflector 56. The lever 52 is positioned such that, as a in result of a counterclockwise rotation of the shaft 54, the deflector 56 will obstruct the guide track 47 to deflect the pin 44 of a selected of hook 38 from the main section 48 into the by-pass section 50. As best shown in FIGS. 2 and 3, the shaft 54 has a fixed flange 58 radially projecting therefrom in cooperating engagement with a trunnion 60 located at an end of a shaft 62 of a pneumatic cylinder 64, whereby a retraction of the shaft 62, upon actuation of the cylinder 64, causes a pivot of the flange 58 and thus a partial rotation of the shaft 54, thereby raising the deflector 56.

The closed circuits defined by the first and second chains 18 and 28 are sized and positioned such that the tips 39 of the hooks 38 may move upward from the top side 36 of the chain conveyor 12 slightly before each stopper 14 if the pins 44 thereof become engaged in the by-pass section 50, as depicted in FIG. 4. For instance, the primary gears 20 and 22 and the secondary gears 24 and 30 of the present turning device 10 may have the same specifications to provide a 1:1 ratio, whereby the first chain 18 and the chain conveyor 12 move at the same speed and in the same direction.

A sensor device 66 as known in the art, located upstream of the turning device 10, scans the lumber pieces 16 carried by the stoppers 14 of the chain conveyor 12 for analyzing whether the most irregular side of the scanned lumber piece 16 faces upward or downward. If the lumber piece 16 is not in the desired position, a signal is sent from the sensor device 66 to a controller (not shown) wherefrom the lever 52 of the turning device 10 is actuated, as described above, to deflect the pin 44 of an appropriate hook 38 in the engagement by-pass section 50. The tip 39 of the hook 38 so engaged in the by-pass section 50 strikes the downward facing side of the lumber piece 16 (see FIG. 4), thereby turning it by 180° to achieve the desired position of the lumber piece 16. The deflector 56 will continue to obstruct the main section 48 as long as the sensor 66 detects successive lumber pieces 16 which need to be flipped over. The hooks 38 are positioned with respect to the stoppers 14 such as to ensure a proper rotation of the wood pieces 16.

The turning device 10 is generally used upstream of a planing machine to optimize the planing of the wood pieces by positioning the flash side thereof upwardly, or downstream of the planing machine to classify the pieces in different categories. The turning device 10 is simple and its small size allows for an easy adaptation to a chain conveyor. The speed of operation of the turning device 10 may vary (e.g. 30 to 200 pieces per minute). The turning device 10 may be used with wood pieces of varying specifications (e.g. range of width: 2.5 to 12 inches, and of thickness: 1 to 4 inches).

Such a turning device increases the efficiency, the speed and the productivity of the wood turning process. Furthermore, it provides a considerable ergonomical aspect as its use allows for a decrease in the manual work which is a source of tendinitis and other diseases.

We claim:

1. A turning device for use in concert with a conveyor adapted to feed elongated wood pieces one-by-one to the turning device, comprising:

a guide having a main section and a secondary section;

at least one turning member engaged to said guide, the at least one turning member being moveable between said main section of said guide and said secondary section of said guide;

a carrier for displacing maid at least one turning member in said guide;

a sensor located upstream of said turning member, for scanning the wood pieces on the conveyor; and an operator connected to said sensor and adapted, when actuated by said sensor, to selectively cause said turning member to be displaced from said main section to said secondary section in which said turning member turns a given elongated wood piece on the conveyor to a desired position.

2. A turning device as defined in claim 2, wherein said carrier guide is a closed-loop guide.

3. A turning device as defined in claimed 1, wherein said operator comprises a movable deflector adapted to be displaced between first and second positions by said sensor, whereby in said first position said turning member remains in said main section whereas in said second position said turning member is guided to said secondary section for turning a given elongated wood piece on the conveyor to the desired position.

4. A turning device as defined in claim 3, wherein said deflector is adapted in said second position to block said main section for forcing said turning member into said secondary section.

5. A turning device as defined in claim 4, wherein said deflector is pivotally mounted.

6. A turning device as defined in claim 1, wherein said carrier comprises at least one closed-loop chain with said turning member being mounted to said chain.

7. A turning device as defined in claim 6, wherein said turning member is pivotally mounted at one end thereof to said chain, another end of said turning member being adapted, when said at least one turning member is in said secondary section of said guide, to contact the given elongated wood piece for turning the latter to the desired position.

8. A turning device as defined in claimed 1, wherein said turning member is pivotally mounted to said carrier, said carrier and said guide being located under a section of the conveyor carrying the elongated wood pieces, said turning member in said secondary section of said guide extending upwardly through a plane defined by the undersurfaces of the elongated wood pieces being carried by the conveyor.

9. A turning device as defined in claim 1, wherein said turning member comprises a guide pin, said guide comprising a guide track defining said main and secondary sections, said guide pin being engaged in said guide track, said operator being adapted to selectively deflect said guide pin from maid main section into said secondary section when said sensor determines, that an elongated wood piece has to be turned, whereby while said guide pin is being displaced in said secondary section said turning member causes the elongated wood piece to turn on the conveyor.

* * * * *

UNITED STATES PATENT AND TRADEMARK OFFICE
CERTIFICATE OF CORRECTION

PATENT NO. : 6,769,529 B2  
DATED : August 3, 2004  
INVENTOR(S) : Germain Fournier and Claude Goulet It is certified that error appears in the above-identified patent and that said Letters Patent is hereby corrected as shown below:

<u>Title page,</u>
Item [73], Assignee, should read: -- 9063-3884 Quebec Inc. --

Signed and Sealed this

Seventh Day of December, 2004

JON W. DUDAS
*Director of the United States Patent and Trademark Office*